(12) United States Patent  (10) Patent No.: US 9,411,074 B2
Whiteman et al.  (45) Date of Patent: Aug. 9, 2016

(54) SECURITY DEVICE

(75) Inventors: Robert Whiteman, Berkshire (GB); Christopher John Eastell, Swindon (GB)

(73) Assignee: DE LA RUE INTERNATIONAL LIMITED, Hampshire (GB)

( * ) Notice: Subject to any disclaimer, the term of this patent is extended or adjusted under 35 U.S.C. 154(b) by 789 days.

(21) Appl. No.: 13/263,618

(22) PCT Filed: Apr. 13, 2010

(86) PCT No.: PCT/GB2010/000746
§ 371 (c)(1),
(2), (4) Date: Jan. 20, 2012

(87) PCT Pub. No.: WO2010/119247
PCT Pub. Date: Oct. 21, 2010

(65) Prior Publication Data
US 2012/0139230 A1  Jun. 7, 2012

(30) Foreign Application Priority Data
Apr. 14, 2009 (GB) .................... 0906366.0

(51) Int. Cl.
*B42D 25/364* (2014.01)
*B42D 25/324* (2014.01)
*G02B 1/00* (2006.01)
*B42D 25/29* (2014.01)

(52) U.S. Cl.
CPC ............. *G02B 1/005* (2013.01); *B42D 25/29* (2014.10); *B42D 25/324* (2014.10); *B42D 25/364* (2014.10); *B42D 2033/12* (2013.01); *B42D 2033/24* (2013.01); *B42D 2033/26* (2013.01); *B42D 2035/20* (2013.01); *B42D 2035/34* (2013.01)

(58) Field of Classification Search
CPC ........... B42D 2033/12; B42D 2033/26; B42D 25/324
See application file for complete search history.

(56) References Cited

U.S. PATENT DOCUMENTS

| 1,901,049 A | 3/1933 | von Heinrich |
| 2,009,185 A | 7/1935 | McCorkindale |
| 4,186,943 A | 2/1980 | Lee |
| 6,337,131 B1 | 1/2002 | Rupaner et al. |
| 2004/0131799 A1 | 7/2004 | Arsenault et al. |
| 2004/0253443 A1 | 12/2004 | Anselmann et al. |

(Continued)

FOREIGN PATENT DOCUMENTS

| DE | 10 2006 051 524 A1 | 4/2008 |
| EP | 0 435 029 A2 | 7/1991 |

(Continued)

OTHER PUBLICATIONS

Pursiainen et al., "Nanoparticle-tuned structural color from polymer opals," Optics Express, Jul. 23, 2007, pp. 9553-9561, vol. 15-No. 15.

(Continued)

*Primary Examiner* — Kyle Grabowski
(74) *Attorney, Agent, or Firm* — Oliff PLC

(57) ABSTRACT

A security device is disclosed having a region of piezochromic material and an integrated relief structure. The security device is arranged such that when a stress is generated in the piezochromic material and relief structure, an optical effect is generated in the piezochromic material.

33 Claims, 6 Drawing Sheets

(56) References Cited

U.S. PATENT DOCUMENTS

| | | |
|---|---|---|
| 2005/0029800 A1 | 2/2005 | Disano et al. |
| 2005/0228072 A1 | 10/2005 | Winkler et al. |
| 2010/0045027 A1* | 2/2010 | Whiteman .................. 283/107 |
| 2013/0001940 A1* | 1/2013 | Arsenault et al. ............... 283/67 |

FOREIGN PATENT DOCUMENTS

| | | |
|---|---|---|
| EP | FR 2 698 390 A1 | 5/1994 |
| EP | 1 398 174 A1 | 3/2004 |
| EP | 1 972 463 A2 | 9/2008 |
| EP | 1972463 * | 9/2008 |
| EP | 2 003 623 A1 | 12/2008 |
| WO | WO 83/00659 A1 | 3/1983 |
| WO | WO 95/10419 A1 | 4/1995 |
| WO | WO 95/10420 A1 | 4/1995 |
| WO | WO 00/39391 | 7/2000 |
| WO | WO 00/50249 A1 | 8/2000 |
| WO | WO 03/054279 A3 | 7/2003 |
| WO | WO 03/061980 A1 | 7/2003 |
| WO | WO 03/062900 A1 | 7/2003 |
| WO | WO2005120855 * | 12/2005 |
| WO | WO 2008/017864 A1 | 2/2008 |
| WO | WO 2008/017869 A1 | 2/2008 |
| WO | WO2008049632 * | 5/2008 |
| WO | WO 2008/098339 A1 | 8/2008 |

OTHER PUBLICATIONS

Arsenault et al., "Interactive Elastic Photonic Crystals," Optical Document Security, Jan. 23-25, 2008, pp. 1-10.

International Search Report mailed Feb. 28, 2011 issued in International Patent Application No. PCT/GB2010/000746.

* cited by examiner

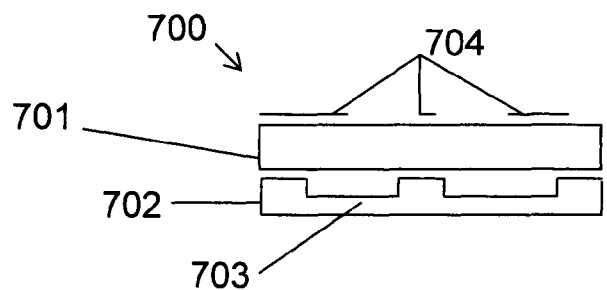
Figure 14
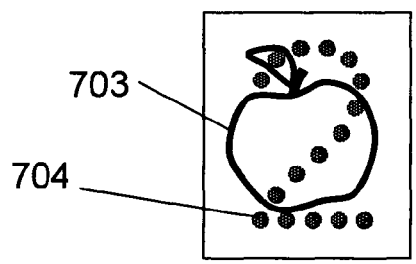  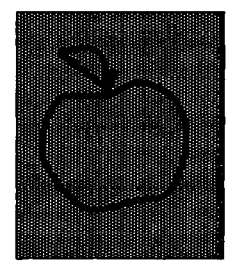
Figure 15a Figure 15b Figure 15c
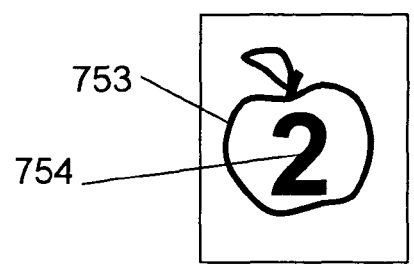 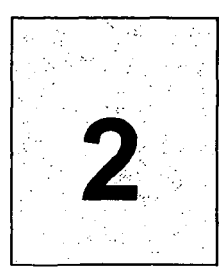 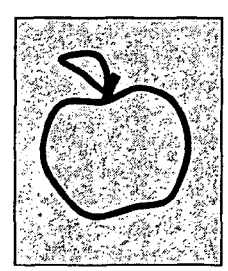
Figure 16a Figure 16b Figure 16c

SECURITY DEVICE

FIELD OF THE INVENTION

The present invention relates to improvements in security devices that can be used in varying shapes and sizes for various authenticating or security applications.

BACKGROUND TO THE INVENTION

Security documents such as banknotes now frequently carry optically variable devices that exhibit an angularly dependent coloured reflection. This has been motivated by the progress in the fields of computer-based desktop publishing and scanning, which renders conventional security print technologies such as intaglio and offset printing more prone to attempts to replicate or mimic. It is well known in the prior art to use liquid crystal materials or thin film interference structures to generate such angularly dependent coloured reflection. Examples of liquid crystal based security devices are described in EP0435029, WO03061980, and EP1156934 and examples of security devices utilising thin film interference structures are described in U.S. Pat. No. 4,186,943 and US20050029800.

The planar nature of liquid crystal films and thin film interference structures results in the observed angularly dependent coloured reflection exhibiting limited spatial variation for example a simple red to green colour change on tilting the security device away from normal incidence.

Photonic crystals are structured optical materials in which the refractive index varies periodically in two or preferably three dimensions. These materials exhibit a range of interesting optical effects when subject to electromagnetic radiation of a wavelength comparable to the spatial modulation of the refractive index. Bragg reflection may occur over a range of wavelengths that depend on the direction of incidence/propagation and the periodicity of refractive index variation. This gives rise to photonic 'energy gaps' that are analogous to the electronic band gaps in semiconductors. Typically, electromagnetic waves within a certain frequency range cannot propagate in particular directions within the crystal, and incident electromagnetic radiation at these wavelengths is consequently reflected. It is the presence of such partial photonic band gaps that gives rise to the shimmering colours observed in opal gemstones.

In general there is a complex dependence on the wavelength, direction of propagation and polarisation that dictates which electromagnetic waves may propagate within the photonic crystal and those that are otherwise reflected. However, if the modulation in refractive index is sufficiently strong, propagation of certain frequencies can be forbidden for any crystalline direction, and a complete photonic band gap arises. In this case light is prevented from propagating within the crystal in any direction, and the material acts as an ideal reflector such that all light of a wavelength within the band gap range is perfectly reflected irrespective of the incident direction.

There exists two well-documented methods of fabricating structures with the necessary highly ordered variation in refractive index—microfabrication and self-assembly. Due to the complexity of microfabrication considerable effort has been devoted to investigating self-assembling systems comprised of submicron three-dimensional arrays of dielectric spheres. Such photonic crystals are formed by allowing a colloidal suspension of identically sized spheres to settle slowly under the influence of gravity or by the application of an external force such that the spheres are encouraged to order. One example is the fabrication of synthetic opal structures where uniformly sized sub-micron silica spheres are organised through a sedimentation process into a face-centred cubic crystal structure.

Further enhancements to this technique have been developed such that the synthetic opal acts as a precursor or template to further customise the structure. It has been shown that it is possible to use such systems as templates to realise materials known as inverse or inverted opals. Here, the regions between the silica spheres are first filled with a suitable matrix material, and the silica is then dissolved by chemical means to give a system that consists of an array of air spheres or voids surrounded by a uniform matrix.

The optical properties of photonic crystals can be engineered and varied to a greater extent than the optical properties of planar liquid crystal and thin film interference devices. Firstly the angular and wavelength dependence of the reflected light can be more easily controlled by varying the crystal lattice structure by either simply adjusting the sphere size, or the sphere separation. Similarly, selected allowed and disallowed reflections/transmissions may be engineered or enhanced by introducing structural defects into the lattice or by introducing nanoparticles into the structure. This in principle gives freedom to modify and engineer the band structure and hence the wavelength and spatial dependence of the reflectivity.

The use of photonic crystals in security devices is known from the prior art and examples include WO03062900, US20050228072 WO2008017869, WO2008017864, WO2008098339 and EP1972463. Furthermore the interactive nature of such materials has been documented in a paper "Interactive Elastic Photonic Crystals", A. C. Arsenault et al, presented at the conference "Optical Document Security", San Francisco, 23-25 Jan. 2008. The challenge for the use of photonic crystals in security devices is how to incorporate such devices into security documents such that the additional optical effects possible from photonic crystals, compared to other well known dichroic materials, can be used to validate the document. The object of the current invention is to improve the security of the devices described in the prior art and provide a practical solution to the problem of how to use these and other similar materials as authenticating devices.

SUMMARY OF THE INVENTION

A number of different aspects of the invention are now discussed, each including a piezochromic material and a relief structure whereby an optical effect is produced within the piezochromic material as a result of a stress being generated within it. A piezochromic material is here defined as any material that changes colour on the application of a deformation. Much of the discussion herein is focussed upon photonic crystals as examples of piezochromic materials. One class of alternative piezochromic materials to photonic crystal materials is liquid crystal materials. French patent application FR2698390 provides examples of cholesteric and nematic liquid crystal materials that change colour under the application of a pressure. Alternatively it is also known that in lyotropic liquid crystal materials it is possible to produce colour changes by the application of pressure to disturb the layers of crystals and thereby alter their transmission characteristics.

Typically the stress generated within each of the piezochromic material and relief structure will be an applied stress, although in principle the stress could be an internal stress caused by a mechanism such as thermal expansion. The stress may take a number of forms and could be tensile in nature although in most cases the stress will be a compressive stress, particularly when applied externally. Mixed stresses having tensile and compressive elements are also contemplated. The effect of the stress is to induce a strain in at least the piezochromic material (thereby causing an optical effect which may itself be a change in optical effect). Some appreciable strain in the relief structure may also be exhibited.

In accordance with a first aspect of the invention we provide a security device having a region of piezochromic material and an integrated relief structure, the device being arranged such that when the piezochromic material and relief structure are together subjected to a stress an optical effect is generated in the piezochromic material and wherein the device comprises first and second discrete absorbing regions whereby at least one of the said first and second absorbing regions comprises the relief structure.

The first aspect of the invention relates to the relative appearance of first and second light absorbing regions (including non-visible light), which in many cases will be layers. Typically these discrete regions will be of different colours. The term "colour" in all aspects of the invention is intended to include white/mirrored (essentially reflecting at all relevant wavelengths), black (essentially absorbing at all relevant wavelengths) and wavelengths outside the human-visible range. At least one of the first and second absorbing regions comprises the relief structure in that it is the structure, is integrated with the relief structure or is overlaid upon a relief structure such that the absorbing region adopts a relief itself. One example of such a relief structure is intaglio printing. The regions are discrete in the sense that they are, one or more of: physically different materials or structures, spatially separate or of different optical properties in terms of absorbance. They may be separately applied coatings or layers although they could have the same absorbing characteristics. Thus the security device of the first aspect may be thought of as comprising two regions (A and B) where at least one of the regions comprises a relief structure and where each region has its own distinct absorbing layer. The absorbing layers can be mounted to the piezochromic material between the piezochromic material and the relief structure or can be printed onto the substrate. If the relief structure is transparent then an absorbing layer could be located upon an opposing side of the relief structure. The absorbing layers are typically dark in appearance. In many cases they may be a non-selectively absorbing material. However, they may be a pigmented ink or a non-pigmented absorbing dye. In addition to the absorbing layer, the structure of the piezochromic material itself may be provided with absorbing regions (an absorbing phase) which, like the absorbing layer, increase the contrast of any optical effect observable. The relief structure itself can act as the absorbing layer. For example the relief structure may take the form of a darkly coloured raised intaglio printed image. Such absorbing layers may be provided with the other aspects of the invention discussed below.

The first and second discrete absorbing structures may therefore be provided upon opposing sides of the security device. A first part of a composite image may be represented in a first absorbing region and a second part of a composite image may be represented in a second absorbing region, such that the first and second images form a resultant composite image when combined. One or each of the composite images may form part of the optical effect in the piezochromic material region.

Each aspect of the invention provides a device for delivering enhanced security by generating an optical effect in a region of piezochromic material as a result of applying or generating a stress in the region of piezochromic material and relief structure. The relief structure which is integrated into the device, either in combination with an absorbing layer or itself acting as the absorbing layer, is placed in sufficient proximity to the piezochromic material such that the piezochromic material experiences localised variations in stress resulting from the relief structure and these localised variations result in a strain which generates an optical effect which is observable by the human eye or other means.

A number of different implementations of the integrated relief structure are envisaged, these typically being coupled to the region of piezochromic material either directly or via an intermediate structure such as a layer. Alternatively the relief structure may be integrated within the device by being formed within the region of piezochromic material, such as in the case of surface relief (for which see the third aspect discussed below).

The relief structure can be formed by a number of different processes and typically these generate relief as a raised or textured surface. Examples of the integrated relief structure include one or more perforated regions, an embossed surface, a printed surface (using an ink which exhibits relief such as by using the intaglio process) and a watermark. Furthermore, a relatively rigid material having a relief profile formed by using one of a number of different techniques (such as cutting, grinding, embossing, and so on) can be prepared and then incorporated as the integrated relief structure. The relief structure may comprise a region which is raised or lowered with respect to the surrounding material.

In accordance with a second aspect of the present invention we provide a security device having a region of piezochromic material and an integrated relief structure, the device being arranged such that when the region of piezochromic material and relief structure are together subjected to a stress an optical effect is generated in the piezochromic material and wherein the integrated relief structure is a watermark.

Watermarks in fibrous substrates exhibit a variation in relief due to the variation in the number of fibres present in different regions of the watermark. Essentially the fibre density per unit volume remains substantially constant and the thickness is modulated. We have found that although the relief in a conventional multitonal banknote watermark cannot be felt by touch, the relief caused by the variation in fibre volume is sufficient to generate an optical effect in a piezochromic material such as a photonic crystal. Various watermarking techniques are known which may be used to implement the invention, such techniques producing localised thinning of the material, localised thickness variations or a combination of each.

It will also be appreciated that in some cases the relief may be caused by a local reduction in the surface height and therefore below the height of the surrounding material. Certain types of watermarks would produce such relief. However, in other cases the presence of projecting regions (of a height in excess of the surrounding material) may be more convenient to fabricate.

A watermark therefore may act as a relief structure in that the change in relief is as a result of the difference in the number of fibres across the watermark. This is different from an intaglio embossed structure where the thickness of the substrate actually remains substantially constant but its position is caused to be modulated with respect to a line defining a plane prior to the embossing being performed. The variation in the number of fibres provides the watermark with a variable optical density enabling the pattern to be viewed in transmitted light unlike a conventional blind embossed structure (one without inking) which is not substantially viewable in transmitted light.

Preferably in the security device of this aspect a first part of the watermark is covered by the piezochromic region and a second part is not covered by the piezochromic region. This is extremely advantageous in that the part not covered may function to provide security in the conventional manner using transmitted light, whereas the covered part may be used to produce an optical effect in the piezochromic region.

It will be appreciated therefore that in each of the first and second aspects of the invention the integrated relief structure is coupled to the region of piezochromic material.

In accordance with a third aspect of the present invention we provide a security device having a region of piezochromic material, the region of piezochromic material having an integrated relief structure, the device being arranged such that when the region of piezochromic material with integrated relief structure is subjected to a stress an optical effect is generated in the piezochromic material. Unlike in the first and second aspects, in this case the relief is present in the structure of the piezochromic material itself. Thus the piezochromic region and relief structure are completely and inseparably integrated. The relief will typically be surface relief which may be in one or each of opposing surfaces. In the case where the material is mounted to a substrate, the relief may be present upon a proximal side or a distal (opposite) side of the region from the substrate.

The relief structure may be mounted to a substrate or it may form part of the substrate material. Two or more relief structures may be provided. For example these might be provided upon opposing faces of the substrate, particularly where a planar substrate is used. The substrate might be used as the substrate for a document and therefore the substrate may be significantly more extensive in its dimension(s) than the security device, this applying to all aspects of the invention.

Two or more relief structures may be provided in each aspect of the invention and they may be used together to generate an image as part of the optical effect. For example a first part of a composite image may be represented in a first of the plurality of relief structures and a second part of the composite image may be represented in a second of the plurality of relief structures. The first and second images (for example regions A and B according to the first aspect) may form a resultant image when combined. If each relief structure is positioned to cause corresponding deformation of the photonic crystal during compression then the resultant image may be visible when the device is compressed.

In some cases the security device comprises a first region of piezochromic material for interacting with (such as covering) a first of the plurality of relief structures and a second region of piezochromic material for interacting with a second of the plurality of relief structures. Thus, if these relief structures are positioned upon opposing sides of a substrate (which may be a document) then a two-sided security device results. If the components used to form the device are sufficiently deformable then a resultant image formed from a combination of each of the two relief structures may be present within the optical effect of each of the piezochromic regions.

Regardless of the relief structure used, the security device may further comprise a printed ink layer having a colour which is substantially the same as at least one of: the colour of the relief structure, the colour of light reflected from the piezochromic material when in a stressed state or the colour of light reflected from the piezochromic material when in an unstressed state.

One or each of the security device and relief structure may comprise a cover layer, which is typically a thin layer and which may serve to protect the material beneath whilst also being transparent.

With or without the presence of the cover layer, the action of stressing the piezochromic region and the integrated relief structure, for example by compression, typically causes a temporary distortion within the structure of the photonic crystal. Such a distortion may last for only a fraction of a second upon removal of the stress, or may last for minutes or even hours. Alternatively the distortion may be permanent and this would be particularly useful in security devices which only need to be validated once for example as a tamper evident security device.

A number of different types of piezochromic materials may be used to implement the invention and it is preferred that photonic crystals are used. Preferably the photonic crystals are elastic photonic crystals in that at least some of the component materials from which they are constructed provide a significant amount of elastic strain in response to a compressive stress. This effect may in part be due to the geometry of the material, for example where voids are present as is the case in an inverse opal structure.

It is particularly preferred if the region of piezochromic material is arranged as a film or other thin layer. A thin layer may assist in providing at least partial transparency of the piezochromic material which may be used to provide additional optical properties, such as features observable in reflection and transmission.

Where photonic crystals are used they may include nanoparticles distributed homogeneously, inhomogeneously in regions, or having a concentration gradient.

The optical effect may comprise a first optical effect in a region of deformation of the piezochromic material and a second optical effect in a region which is not deformed, the deformation being the result of the stress experienced by the material. One or each may be optically variable effects. The optical effect may therefore represent a change in colour (particularly when within the visible part of the spectrum). It also may represent a change to or from complete broad spectrum reflection (regardless of wavelength). Furthermore, one or each may be invisible to the human eye and therefore may exhibit their effects in the ultra-violet or infra-red regions of the electromagnetic spectrum. In general the optical effect is representative of the relief of the relief structure although this is not essential. Thus if the relief is formed as an image, then the optical effect in the photonic crystal may be a similar or complementary image. Thus the optical effect may reproduce the image. If the relief within the contact structure is on a fine scale then the optical effect may simply represent more general features of the relief such as its lateral scale or regions in which the relief height changes most severely.

The invention is not limited to optical effects observable only in the visible spectrum. One or each of the first and second optical effects may be an effect in one of the ultraviolet, visible, or infra-red parts of the electromagnetic spectrum. When such effects are not visible to the human eye, they may be observed using appropriate apparatus.

The piezochromic material may be provided in a number of forms, for example as a self-supporting layer. Alternatively, it may be supported by a substrate or carrier layer to which it is mounted directly or indirectly (through one or more further layers). The substrate or the carrier layer may take the form of a polymeric layer. The piezochromic material may also take the form of a pigmented coating or layer where the piezochromic material is in the form of a pigment.

It is also preferred that the optical effect of the security device is arranged to be machine-readable. This may be achieved in a number of ways. For example the change in wavelength of the reflected light with change in direction of incident light could be used for machine authentication. In a further example at least one layer of the device (optionally as a separate layer) or the piezochromic material itself may further comprise machine-readable material. Preferably the machine-readable material is a magnetic material, such as magnetite. The machine-readable material may be responsive to an external stimulus. Furthermore, when the machine-readable material is formed into a layer, this layer may be transparent.

The device may be located within or attached to a document such as a security document when in use. The device may be positioned within the document such that the device has a first face on a first side of the document and a second face on an opposing side of the document. Thus the security device may adopt a through-thickness arrangement. The device may be mounted to a window in the document or may actually function as the window.

Windows in banknotes are known in the art and typically allow an observer to look through the banknote, as a security feature. For example, WO8300659 describes a polymer banknote formed from a transparent substrate comprising an opacifying coating on both sides of the substrate. The opacifying coating is omitted in localised regions on both sides of the substrate to form a transparent region. EP1141480 describes a method of making a transparent region in a paper substrate. Other methods for forming transparent regions in paper substrates are described in EP0723501, EP0724519, EP1398174 and WO03054297.

Examples of security documents for use with the device include banknotes, cheques, passports, identity cards, certificates of authenticity, fiscal stamps and other documents for securing value or personal identity.

The security device may take various different forms for use with security documents, these including a security thread, a security fibre, a security patch, a security strip, a security stripe, a security foil or a security coating or printed layer as non-limiting examples.

With reference to photonic crystals as examples of piezochromic materials, the photonic crystal material may be based on an inverse opal structure or an opal structure. The 'sponge-like' nature of the inverse opal structure allows it to be more readily compressed and therefore more suitable for the current invention. Compressing such a material distorts the periodicity of the structure and consequently can affect a change in the visual appearance. This may be assisted by the use of an elastomeric matrix material, which naturally gives a more flexible system.

Suitable materials for use in inverse opal structures are disclosed in WO2008098339. The inverse opal film can be generated using a template, in one example the template is formed by using self-assembly techniques to order spheres on a glass substrate. The spheres may be inorganic for example silica or polymeric for example polystyrene. The voids between the spheres are then filled with a polymer material. Examples of suitable polymer materials are listed in WO2008098339 and include a monomer or pre-polymer selected from the group consisting of methacrylic acid esters, acrylic acid esters, polyisoprene, polybutadiene, polyurethane precursors, crosslinkable polyethers, and mixtures thereof. The spheres are then removed by an appropriate etchant or solvent depending on the type of sphere material used. In the case of polystyrene the spheres are dissolved by an appropriate solvent to give a system that consists of an array of air spheres or voids surrounded by a uniform matrix. More information on the selection of an appropriate solvent to dissolve polymer microspheres can be found in "An Introduction to Polymer Colloids", 1$^{st}$ Edition, published by Springer in December 1989.

If the inverse opal structures are to be used as a pigment in a coating or printing ink then the film can be converted into a pigment for example by detaching the film from the substrate and breaking the film up to the desired particle size.

The photonic crystal security device may also contain regions comprising both standard opal structures and inverse opal structures. Both structures exhibit the phenomenon known as structural colour whereby their visual appearance is a function of their configuration; in particular the arrangement, size and refractive index (relative to the matrix) of the spheres or voids.

The regions composed of an inverse structure will show greater optical variability as a function of compression compared to those composed of a standard opal-like structure. This may be assisted by the use of an elastomeric matrix material, which naturally gives a more flexible system.

One further advantage of such a feature is the possibility of deriving one region (the inverse opal) from the other (the opal). This will involve post-processing a continuous opal-like structure, for example using the techniques discussed earlier, to convert a selected region to an inverse opal-like structure. In other words, a security device could be made by 'patterning' and converting regions of standard opal-like structure to ultimately give two type of crystal structure.

In practice, most inverse opal-like structures are achieved by first fabricating a standard opal and then selectively removing the submicron spheres by a selective etching process that leaves the matrix material unaffected. If a security device were made form a suitable material system it would be possible to etch out the spheres in chosen regions whilst leaving other areas unaltered. The resultant feature would have a continuous matrix. For example one way of producing such a device would be to follow the method described above for the inverse opal structure but then only dissolve the spheres in localised regions to give a material that in a first region consists of air spheres separated by a uniform matrix of the polymeric material and in a second region consists of polystyrene spheres surrounded by the uniform matrix of the polymeric material.

In accordance with a further aspect of the invention we provide security device having a piezochromic material and an integrated relief structure, the device being arranged such that when the piezochromic material and relief structure are together subjected to a stress an optical effect is generated in the piezochromic material. This aspect therefore includes within its scope each of the first, second and third aspects of the invention discussed earlier. It should be noted here that the features discussed in relation with particular aspects of the invention are intended to be combined with each of the other aspects of the invention.

Specifically, this further aspect of the invention therefore includes the first aspect of the invention and the associated examples contemplated or described herein in which there exists first and second discrete absorbing regions, at least one of which comprises the relief structure. This further aspect also includes within its scope security devices in which only one discrete absorbing region is present, in which the first and second regions are not discrete or in which the relief structure is substantially non-absorbing at the relevant wavelengths. This further aspect of the invention further includes the second aspect of the invention and the associated examples contemplated or described herein in which the integrated relief structure is a watermark. Furthermore this further aspect includes security devices in which the integrated relief structure is not a watermark and may be a number of other structures including printed, embossed and other surface-modified structures including perforated structures. This further aspect of the invention further includes the third aspect of the invention and the associated examples contemplated or described herein in which the piezochromic material has the integrated relief structure itself, together with examples in which the relief structure is not part of the piezochromic material.

BRIEF DESCRIPTION OF THE DRAWINGS

Some examples of security devices according to the invention are now described, with reference to the accompanying drawings, in which:—

FIG. 14 shows a thirteenth example security device having a watermark and overprinted photonic crystal;

FIG. 15a shows the relative arrangement of the images in the thirteenth example;

FIG. 15b shows the appearance of the thirteenth example without an applied compressive stress;

FIG. 15c shows the appearance of the thirteenth example under compressive stress;

FIG. 16a shows the relative arrangement of the images in a fourteenth example;

FIG. 16b shows the appearance of the fourteenth example without an applied compressive stress; and, FIG. 16c shows the appearance of the fourteenth example under compressive stress.

DESCRIPTION OF EXAMPLES

In the examples described below various arrangements of photonic crystal and relief structure are discussed, these together causing associated optical effects. Photonic crystals are discussed herein as examples of piezochromic materials. The different effects and material properties discussed within the examples are intended to exemplify the range of possible features of the security devices and are not therefore intended to indicate only that particular effect—arrangement combinations are possible. In general, these are interchangeable between the examples.

Figure 1:
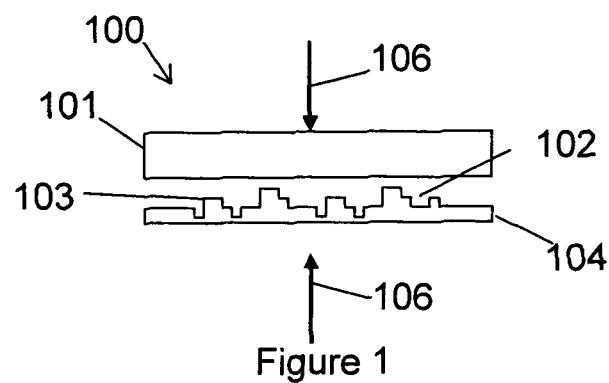
FIG. 1 is a schematic view, partly in section of a first example security device having a watermark.

Referring to FIG. 1, the security device 100 is formed from an elastic photonic crystal film 101 (as an example piezochromic material) applied by means of a thin layer of adhesive (not shown) to the surface of a watermark 102 formed in a paper substrate 104. The photonic crystal 101 takes the form of a film of a thickness of under 200 micrometres, preferably less than 50 micrometres and even more preferably less than 30 micrometres. The use of a film is advantageous in that, since it is thin, it is relatively easy to distort the photonic structure and therefore to produce an optical effect. A further discussion of suitable materials of this type can be found in a paper "Interactive Elastic Photonic Crystals", A. C. Arsenault et al, presented at the conference "Optical Document Security", San Francisco, 23-25 Jan. 2008. In this and other examples, the photonic crystal can alternatively be applied as a coating or printing to the surface of the watermark 102 (or other relief structure).

In the present case the photonic crystal film comprises carbon nanoparticles which enhance resonant scattering events that occur within the photonic crystal giving rise to strong structural colours and, in this example obviating the need for additional absorbing layers (discussed in some later examples).

It has been reported in the scientific literature, (see Optics Express, Vol. 15, No. 15, Page 9553-9561, 23 Jul. 2007), that nanoparticles can be introduced into the matrix of a photonic crystal in order to change or enhance the observed colours, colourshifts and tolerance on illumination angle.

Preferably the size of the nanoparticles is selected such that they sit within the interstitial sites of the crystal lattice. The nanoparticles enhance resonant scattering events that occur within the photonic crystal giving rise to strong structural colours. For example the incorporation of carbon nanoparticles less than 50 nm in diameter into a system comprising polystyrene spheres with a sphere size of 200 nm in a polyethylacrylate matrix, enhances the resonant scattering of the photonic crystal and dramatically alters the appearance of the photonic crystal film from one with a weakly coloured opalescence appearance to an intensely coloured green film. The use of the nanoparticles therefore provides a key advantage in that strongly intense colours are observed without the requirement for a separate absorbing layer or the incorporation of coarse absorbing particles. Furthermore there is an increased tolerance on illumination angle such that the observed colour is no longer as dependent on the position of the light source. Optionally magnetite nanoparticles can be incorporated to generate a magnetic machine-readable colourshifting film.

The watermark is provided with surface relief (in this case due to local modulation of the thickness as is illustrated at 103). The watermark is provided within a fibrous paper substrate. The security device 100 may be then permanently attached to an object of value, an example of which is a security document. In the absence of a compressive stress the device adopts a "relaxed" state and the photonic crystal film 101 exhibits a first optical effect. This first effect depends upon the material properties of the film (and indeed the illumination which, unless otherwise stated herein, is assumed to be a white light source). In the present case the first effect is a coloured effect caused by an optical band gap existing at selected wavelengths. Upon compression of the device 100 as is illustrated by the arrows 106, the areas of the photonic crystal which are in closest proximity to the most raised parts of the watermark structure, experience a greater localised deformation than the least raised parts. A second optical effect results within the crystal, this effect representing the modulation of the deformation.

The deformation is sufficient to cause a different set of wavelengths to be permitted wavelengths of propagation within the crystal, these wavelengths no longer being present in the observable optical effect (since they are no longer reflected). Since which particular groups of wavelengths are permitted is a function of the magnitude of the deformation, the observable effect is a representation of the watermark thickness modulation. Therefore at least some of the information contained within any image in the watermark is also present within the second optical effect. Thus, the watermark may take the form of an image (this applying to the other examples also). The second optical effect is observable either by placing a transparent material over the device so as to simultaneously apply the pressure for compression and to view the material. However, the photonic crystal is formed in the present case so as to have a slow relaxation time (several seconds to a few minutes) during which time the structure of the photonic crystal elastically recovers to its former state before the compressive stress was applied. This allows time for the second effect to be observed visually in the absence of the compressive stress.

It will be appreciated that the watermark could be replaced by a region of intaglio printing (which exhibits surface relief). The intaglio may be printed using opaque or transparent inks. For example an opaque dark ink may be used which serves to absorb any wavelengths transmitted by the photonic crystal.

Figure 2:
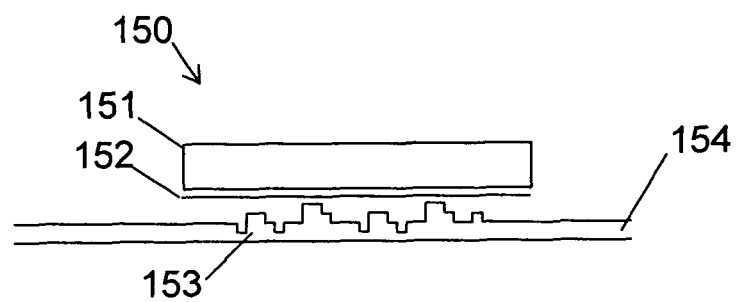
FIG. 2 shows a second example security device having an absorbing layer.

A second example device is illustrated at 150 in FIG. 2. In this case, a watermark 153 is used to provide the relief structure (although intaglio print or an embossed layer could be utilised). Furthermore, between the photonic crystal 151 and the watermark 153, a thin layer of absorbing material 152 is printed onto the face of the crystal which is attached to the relief structure of the watermark. The absorbing material is non-selectively absorbing and therefore increases any optical effect observed in the photonic crystal by providing contrast. Whilst the use of a black, or very dark, substantially totally absorbing layer may give rise to the most strong colourshifts, other effects may be generated by the use of a partially absorbing layer of other colours or a combination of colours, giving rise to differing apparent colourshift colours. Whilst this layer might be provided in addition to the use of nanoparticles within the photonic crystal structure, in the present example no such nanoparticles are present. However, it should also be noted that a similar result may be achieved by the introduction of absorbing particles into the photonic crystal material. If using absorbing particles, the absorbing particles should be significantly greater than the size of the spheres of the photonic lattice such that they do not cause a change in the lattice and consequently an undesirable change in the optical properties. Such absorbing particles may be used in each of the examples discussed herein.

In this case the first effect (non-compression) and the second effect (compression) are each optically variable effects in the visible spectrum, with the effects being different and the second effect generating a rough image of the watermark. In this example the material relaxes to its former state almost instantaneously and therefore is best observed through a transparent member such as a glass plate.

Whilst an image which is raised above the surface such as an embossing or intaglio printed image can be utlilised, it is surprising that a watermark produces a similar effect when a suitable photonic crystal film is pressed against the watermark.

The use of watermarks is fairly common in many security documents. High security multi-tonal watermarks are typically created using a cylinder mould process and are formed by varying the volume of paper fibres so that in some regions the volume of fibres increases, and in others decreases relative to that of the base paper layer which surrounds the watermark region. When viewed in transmitted light the regions with few fibres are lighter and the regions with increased fibres are darker than the base paper, and the contrasts can be seen very clearly. Different types of watermarks have different advantages. A multi-tonal watermark is often a pictorial image, such as a portrait, and can be very detailed and complex which significantly reduces the risk of counterfeiting.

In cylinder-mould papermaking, paper is formed on a partially submerged wire-cloth covered mould cylinder, which rotates in a vat containing a dilute suspension of paper fibres. As the mould cylinder rotates, water is drawn through the wire cloth depositing fibres onto the cylinder surface. When the wire cloth is embossed with a detailed image, the fibres deposit with a lesser or greater thickness on the raised and sunken elements of the embossing to form a fully three-dimensional watermark in the finished paper.

The variation in paper thickness in the final watermark is a result of fibre movement from the raised regions of the embossed mesh to the sunken regions of the embossed mesh as the water is drawn through the wire cloth. The fibre movement, and therefore the tonal variation in the watermark, is governed by the drainage rate and that is dependent on the profile of the embossing. This enables excellent control in the gradation of the watermark pattern, producing a subtle tonal range that is unique to the cylinder mould-made watermark process.

An alternative process for generating uniform light tonal regions (and providing enhanced watermark security) is the electrotype process. In the electrotype process a thin piece of metal, generally in the form of an image or letter, is applied to the wire cloth of the cylinder mould cover, by sewing or welding, creating a significant decrease in drainage and fibre deposition and thereby forming a light watermark in the paper. An electrotype watermark may be lighter than a watermark generated, and produced, by conventional embossing. This electrotyping process is known in papermaking and has been described in U.S. Pat. Nos. 1,901,049 and 2,009,185.

An electrotype watermark is therefore an area of paper having just a uniform decrease in paper thickness. The area is typically quite small and the change in paper thickness quite distinct so as to create a very light image, usually lighter than areas within a pictorial watermark.

Such an effect can be partly mimicked by the counterfeiter by using "transparentising" resins, UV lacquers applied locally or even cooking oil. However, there is a significant problem arising from the use of large thinner areas both in respect of weakening the paper and its poor security.

The advantage of watermarks is that whilst they conventionally provide a security feature visible in transmitted light, they can also be used to provide a latent security feature visible in reflected lighted when a compressible photonic crystal film is pressed onto the watermark region. Counterfeiters attempt to mimic watermarks by printing with variable density inks or by using transparentising resins, UV lacquers applied locally or cooking oil. However this only replicates the effect in transmitted light and will not replicate the effect observed when combined with a compressible photonic crystal film, and therefore the use of a watermark with a piezochromic material region provides further potential protection for a secure document comprising a watermark.

In the case of the use of a watermark, as for other relief structures the light may comprise visible and/or non-visible light, therefore including for example ultraviolet and infrared light. Broad or narrow wavelength bands may be used. Likewise, the photonic crystal may be arranged to selectively reflect light in the non-visible part of the spectrum (including ultra-violet and infra-red).

Figure 3:
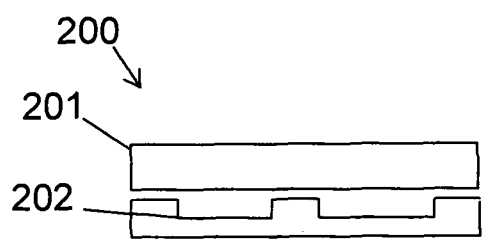
FIG. 3 shows a third example security device containing a watermark.

In a third example 200 shown in FIG. 3, the elastic photonic crystal 201 is attached directly to a paper-based material containing an electrotype watermark 202. The paper-based material could be a banknote or indeed any other document. The watermark 202 is formed using the electrotype process which locally reduces the thickness of the material. Again, as for the above examples, the deformation is greater in some regions than in others. In particular the deformation is less where the watermark thins the paper. These variations in the deformation of the photonic crystal are represented in the optical effects observed. Here, in the absence of compression the band gap of the photonic crystal is such that radiation in the ultra violet wavelength can propagate the crystal while radiation with wavelengths in the visible range are excluded. However, on compression, the band gap prevents radiation in the ultra violet wavelength propagating through the crystal and the material therefore reflects ultraviolet wavelengths in a wavelength selective manner. The present security device is therefore preferably read by a suitable apparatus capable of detecting reflected ultraviolet light.

Figure 4:
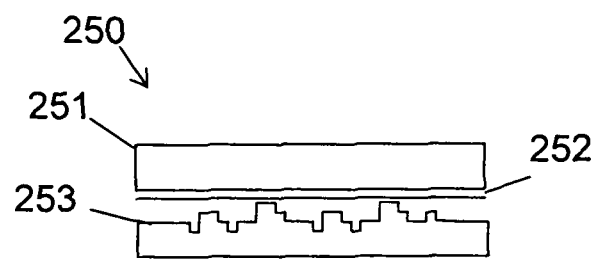
FIG. 4 shows a fourth example security device containing a watermark and absorbing layer.

In a fourth example illustrated in FIG. 4, a cylinder-mould type watermark 253 is used within the security device 250, this having variation in thickness due to the variation in the number of fibres across the device. Again an elastic photonic crystal 251 is used as part of the security device 250. In order to enhance the optical effects generated in the photonic crystal 251, a dark absorbing layer 252 is located between the photonic crystal 251 and the relief structure in the form of the watermark 253. In this case, in the absence of a compressive stress, an optically variable effect is observable in the visible spectrum, this being significantly enhanced in contrast by the use of a dark absorbing layer. Upon compression an optically variable effect is observable in the infra-red part of the spectrum and a forbidden photonic band gap arises for selected visible wavelengths, thus causing a coloured effect in the visible spectrum and a machine readable infra-red effect in the non-visible infra-red spectrum.

Figure 5:
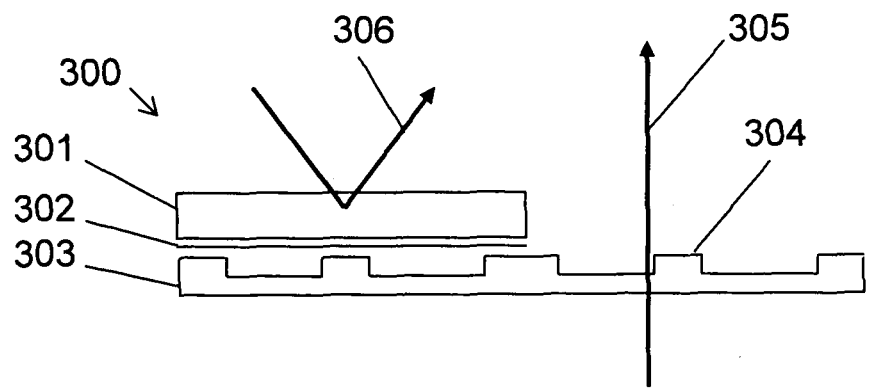
FIG. 5 shows a fifth example security device containing an extended watermark.

A fifth example device 300 shown in FIG. 5 uses an electrotype watermark in two different modes of operation to provide enhanced security. The security device 300 contains a photonic crystal 301, a watermark 303 (which could alternatively by a cylinder mould watermark) and an intermediate black absorbing layer 302. The watermark 303 extends laterally beyond the dimension of the photonic crystal 301 and absorbing layer 302. In the uncovered area illustrated at 304 the image within the watermark is observable in transmission (see arrow 305). In the area covered by the photonic crystal, the watermark is concealed in both transmission and reflection when in the absence of an applied pressure. As in the earlier examples using watermarks, the application of a pressure causes a second optical effect. In this case, in all areas under the photonic crystal where the underlying paper material is not thinned by the watermark, a visible colour change is observable and therefore the image within the watermark is revealed upon the application of a pressure. This is observable in reflection as illustrated by arrow 306.

Figure 6:
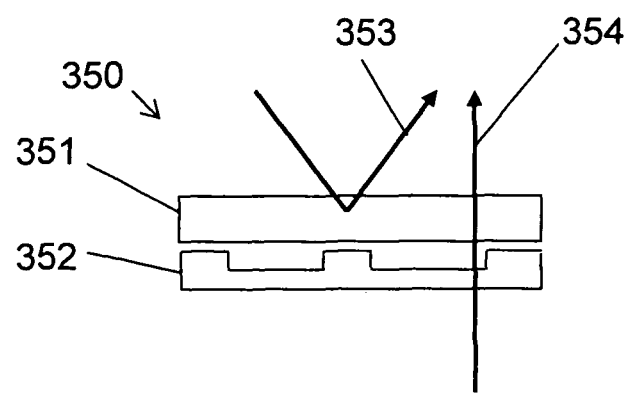
FIG. 6 shows a sixth example security device showing a transmissive effect.

A sixth example shown in FIG. 6 is analogous to the fifth example, except that the sixth example does not use an intermediate absorbing layer and the lateral extent of the watermark (in this case electrotype) does not exceed that of the photonic crystal. The device 350 in this case utilises a thin photonic crystal layer or film 351 which exhibits a degree of transparency. An electrotype watermark is used as is shown at 352. This produces four observable effects and therefore provides additional security features. The first effect is a reflective effect (arrow 353) in the absence of any compression in which a uniformly coloured area is observable in the photonic crystal. The second is a transmissive effect (arrow 354), again in the absence of a compressive stress. Here the watermark image is visible, all parts being the same colour but of different relative intensity, this colour being generated by transmission through by the photonic crystal (note that the colour is different from that observed in the first effect and is the complementary colour). The third effect is a reflective effect (arrow 353) caused by compressive stress where, as for the fifth example, a colour effect is generated caused by the regions surrounding the thinned material of the electrotype watermark. The fourth effect is a transmissive effect (arrow 254) caused upon compression in which the thinned areas of the watermark are observable as a different colour from the surrounding material due to the different relative deformation. It will be appreciated that an optional fifth effect could be provided as a conventional transmissive effect if the watermark were extended beyond the lateral dimensions of the photonic crystal.

Figure 7:
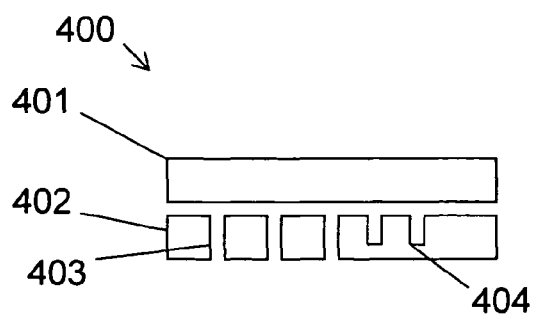
FIG. 7 shows a seventh example security device with perforations.

A seventh example device 400 is illustrated in FIG. 7. This has a photonic crystal 401 bonded to a relief structure 402 having perforated regions. Some of the perforations are through-thickness perforations 403, whereas others are blind perforations 404. The blind perforations act in a similar manner to an electrotype watermark although in this case the process by which they are formed need not be a watermark process, for example the material within which the perforations are formed need not be fibrous. One advantage of using through-thickness perforations is that this allows significantly more light to be passed through the structure in a transmissive inspection arrangement. Each of these types of perforation causes a localised reduction in the compressive stress experienced in the parts of photonic crystal 401 closest to the perforations. The perforations may be generated by a number of techniques including watermarking, die-cutting or laser cutting depending upon their size and the material from which the relief structure 402 is formed. As for the other examples, the relaxation time of the material may be tailored depending upon the application. The first and second optical effects may of course also be controlled according to the application.

Figure 8A:
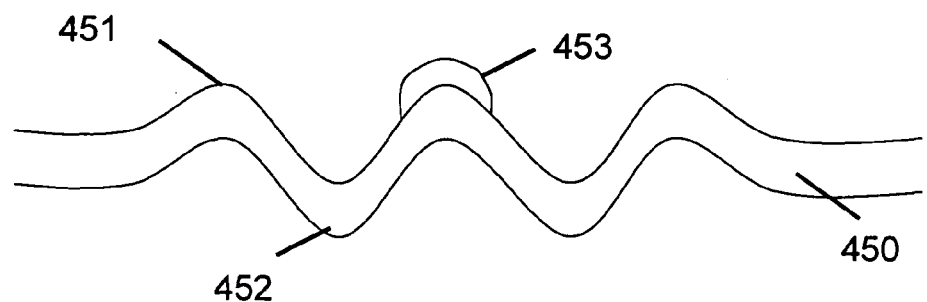
FIG. 8a shows the effect of intaglio printing upon a substrate.

An example relief structure is that of intaglio printing which causes embossing of the substrate which is printed due to the relatively high printing pressures used. Notably the substrate thickness remains substantially constant (unlike in the case of a watermark). In FIG. 8a the effect of intaglio printing upon a substrate 450 is shown. The printing plate is applied from the upper side of the figure which causes the substrate 450 to deform in conformity with the cells of the intaglio plate (in a known manner). Regions of the upper side of the substrate which coincide with recesses of the cells become "debossed" that is they stand or project above the general level of the substrate. Those regions coinciding with cell walls become embossed (being deformed beneath the general level of the substrate). In FIG. 8a a debossed region is shown at 451 and an embossed region is shown at 452. In the technique of blind embossing no ink is applied to the substrate. In many cases however the cells of the intaglio plate are inked and this ink becomes deposited upon the upstanding debossed regions 451, an example of which is shown at 453.

Figure 8B:
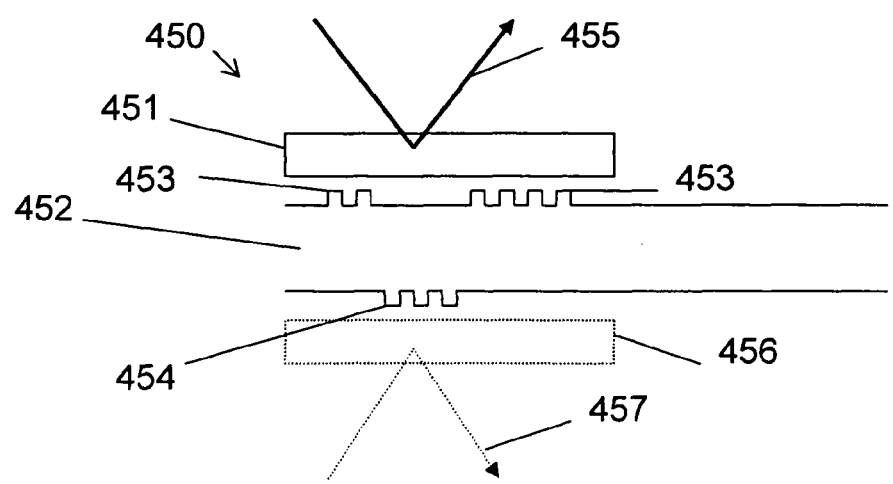
FIG. 8b shows an eighth example security device containing two images.

An eighth example security device 450 is shown in FIG. 8b. In this case there are two relief structures formed upon opposing surfaces of a generally planar thin substrate 452. Such a substrate may be a document of value. On a first face (the upper surface in FIG. 8b) an image 453 is printed as a relief structure, using the intaglio process. A photonic crystal 451 is mounted to the substrate 452 over the image 453. On the reverse (lower) face a second image 454 is provided in a second relief structure, again printed using the intaglio process, this being positioned within the footprint of the photonic crystal 451. It will be appreciated that other types of relief structures could be used here. The two images 453,454 are arranged to be partial images in that, in combination when overlaid, they produce a resultant image that is discernible to an observer. Therefore the individual images may be formed such that an observer may not be able to determine the resultant image without the benefit of seeing the first and second images combined. Despite the two images being located upon opposing sides of the substrate 452, when under compression, provided the substrate is sufficiently thin, the relief for each image may be represented in the second optical effect within the photonic crystal 451 and therefore the resultant image may be observed within the second optical effect by viewing the photonic crystal 451 in reflection as indicated by the arrow 455. As a further option, a second photonic crystal 456 may be positioned upon the reverse face of the substrate (over the second image 454) and observed in the manner shown by the arrow 457. Thus, the resultant image may be observable in each of the photonic crystals 451,457 (one resultant image being the reverse of the other). It should be noted here that each region of intaglio printing (at least when covered by a photonic crystal) acts as a discrete absorbing region in that each is coloured (which could include black). The colour of the intaglio printing affects the optical effect observed within the photonic crystal.

Figure 9:
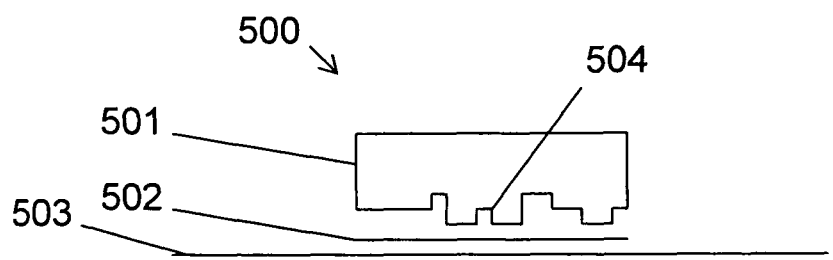
FIG. 9 shows a ninth example security device containing a photonic crystal having relief.

A ninth example security device 500 is illustrated in FIG. 9. Here the relief structure 504 is formed within a surface of the photonic crystal 501 itself. This structure may be formed by a casting or embossing process and provides additional security in that the photonic crystal 501 and the relief 504 are formed from the same material. The crystal 501 is adhered to a substrate 503, with the relief being inward of the main body of the photonic crystal. An optional absorbing layer is illustrated at 502, positioned between the photonic crystal 501 and the substrate 503.

Figure 10:
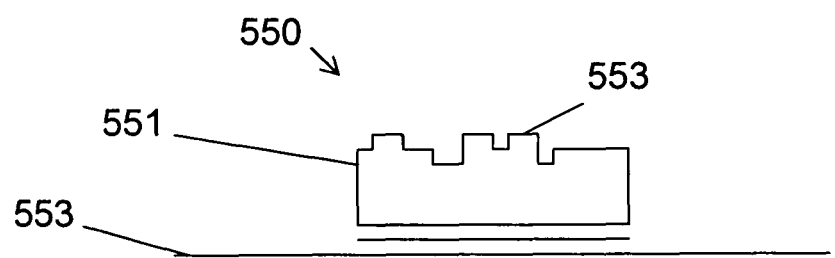
FIG. 10 shows a tenth example security device containing a photonic crystal having relief.

In a tenth example, illustrated in FIG. 10, the security device 550 is similar to that of the ninth example, although in this case the relief 552 in the photonic crystal 551 is uppermost and therefore on the opposite side of the photonic crystal 551 to the substrate 553. As for the other examples, the substrate may be a web which is then attached to another object or document.

Figure 11:
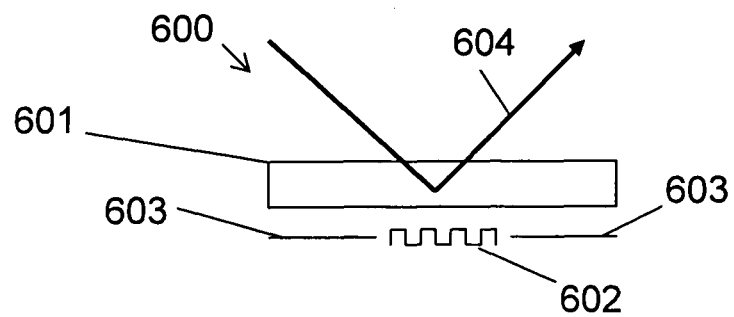
FIG. 11 shows an eleventh example security device having printing with and without relief.
Figures 12A, 12B, 12C:
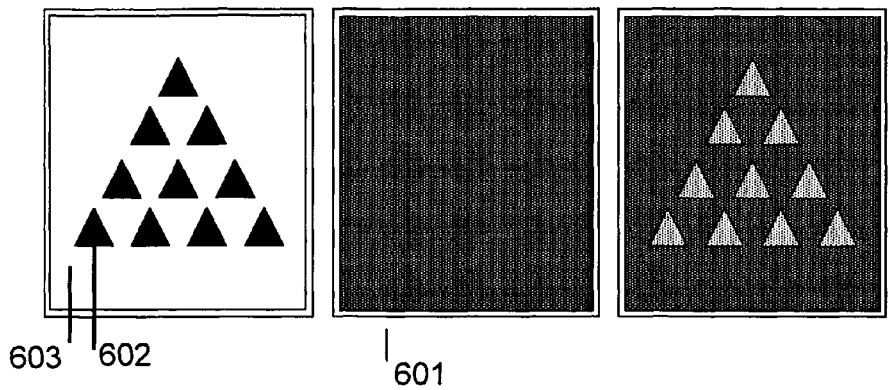
FIG. 12a shows the relative arrangement of the printing in the eleventh example.
FIG. 12b shows the appearance of the eleventh example without an applied compressive stress.
FIG. 12c shows the appearance of the eleventh example under compressive stress.

FIG. 11, showing an eleventh example, illustrates the use of the two discrete absorbing layers in different regions of the device. In this case this is achieved with one layer being a relief structure which is printed and the other layer being a printed region without relief (using a different printing technique) to provide advantageous security features. The security device 600 has a photonic crystal film 601 overlaid upon regions of intaglio print (relief structure) which can be thought of as a first discrete region ("Region A"). This is generally indicated schematically at 602 and is also overlaid upon adjacent litho-print 603 ("Region B"). The litho-print does not have a relief structure. The security device 600 is viewed in reflective mode as shown at 604. The intaglio printing 602 is colour-matched to the litho-print 603 such that they have the same absorbing properties. For example black intaglio and black litho-printing may be used. Thus the difference between the two printing techniques cannot be discerned through the photonic crystal 601 (the regions A and B absorb light similarly and therefore any image present in the relief of the intaglio printing cannot be observed. FIG. 12a shows the arrangement of the litho-printing 603, (the print 603 being shown as white for illustration only) and intaglio printing 602 the intaglio being an image of 10 equilateral triangles arranged in a triangle. In the absence of compression of the device 601 as shown in FIG. 12b, a general first colour (first optical effect) is observable in the photonic crystal. Notably the intaglio image is not visible. Upon compression, as shown in FIG. 12c, the parts of the crystal above the litho-print remain substantially of the first colour (such as green) whereas the regions above the intaglio change colour to a second colour (such as red) and therefore become visible. The second optical effect (the combination of the green and red areas) thus allows the intaglio print to be revealed.

Figures 13A, 13B, 13C:
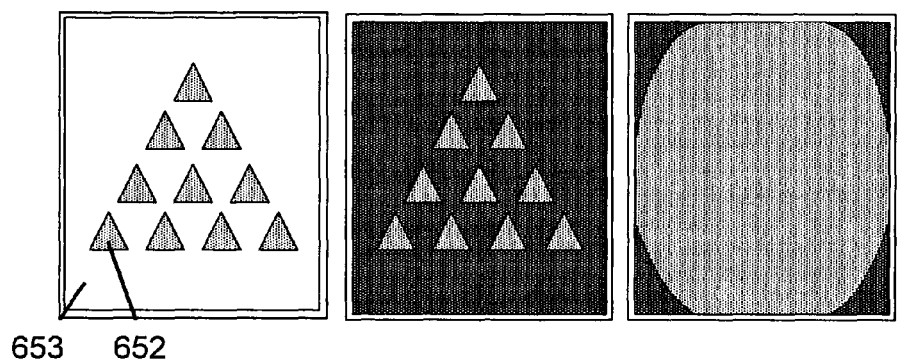
FIG. 13a shows the relative arrangement of the printing in a twelfth example.
FIG. 13b shows the appearance of the twelfth example without an applied compressive stress.
FIG. 13c shows the appearance of the twelfth example under compressive stress.

A twelfth example security device is a variant of the eleventh example. In this case the images of the intaglio and litho-print are reversed and therefore the litho-print is arranged as the triangles 652. The intaglio print 653 is black and the litho-print is a different colour to that of the surrounding litho-print. This is shown in FIG. 13a (the print 653 being shown as white for illustration only). If the litho-print is yellow then, when viewed through the photonic crystal, the photonic crystal over the yellow litho print will appear orange, surrounded by a red background, the colour of the photonic crystal film over the black intaglio, as shown in FIG. 13b. Upon applying a compressive stress as shown in FIG. 13c, the areas compressed by the surrounding intaglio are arranged to change to the orange colour (with the litho-print areas remaining substantially of the same colour). Thus the image of the litho-print disappears and the device appears a uniform colour in this case orange.

Figures 13D, 13E, 13F:
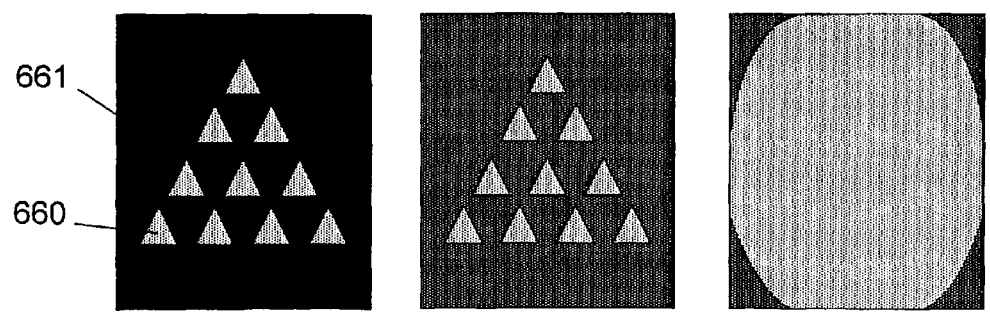
FIG. 13d shows the relative arrangement of the printing in an alternative twelfth example.
FIG. 13e shows the appearance of the alternative twelfth example without an applied compressive stress.
FIG. 13f shows the appearance of the alternative twelfth example under compressive stress.

Alternatively the same effect could be achieved using two intaglio printed relief structures in different colours which have been specifically chosen to have the right absorbing characteristics to achieve the desired effect. This is shown in FIGS. 13d,e,f. In this case the photonic crystal film is selected such that it appears red when relaxed and switches to green when compressed. Triangles of green intaglio print 660 are provided within a black intaglio printed background 661 (see FIG. 13d). The relaxed film reflects red and therefore passes green and blue. The green and blue strike the green pigment in the intaglio 660 and the blue is absorbed and the green is reflected back through the film. Therefore the viewer sees red and green components added together giving yellow (therefore giving colour contrast as shown in FIG. 13e.

When the film is compressed it reflects green and passes red and blue. Neither red nor blue are reflected back form green print, and so it behaves essentially the same as the surrounding black, giving a uniform colour (FIG. 13f).

The examples in FIGS. 11, 12 and 13 describe examples where an image is hidden or revealed. Although this is advantageous embodiments are also contemplated where the use of two distinct absorbing layers simply leads to different optical effects in different regions of the device.

A thirteenth example is shown in FIG. 14. Here a security device 700 has a photonic crystal 701 overlaid upon an electrotype watermark 702 within a substrate. The watermark contains an image 703. This example is absent of an intermediate absorbing layer. On the opposite face of the photonic crystal 701 from that which is adjacent to the watermark 702, an image 704 is printed upon the surface of the photonic crystal using a litho-printing process. One preferred feature in this example is that whilst each of the two images 703,704 lie within the footprint of the photonic crystal, they do not intersect (laterally) at any point (they appear to in the figure). The reason for this is to ensure that each image can be viewed individually under certain conditions. For example, referring to FIGS. 15a, 15b and 15c, FIG. 15a shows the alignment positions of the two images. The image 704 is a numeral "2" and the image 703 within the watermark is an outline of an apple. The printing ink of the image 704 is of a different colour to that of the first optical effect of the photonic crystal (in the absence of an applied compressive stress). Thus, as is shown in FIG. 15b, colour contrast exists between the photonic crystal and the printed image 704 when in a rest state (no compression) and therefore the numeral 2 is visible in reflection. When the device 700 is compressed, the regions of the photonic crystal which are not above the watermark, are compressed, thereby producing a resultant colour in the photonic crystal which matches the colour of the image 704 (the "2"). The "2" therefore disappears. However, in the regions where the underlying electrotype watermark is present, the differential compression results in these areas having a different colour (which may be the same as the non-compressed colour) and therefore the apple image 703 is revealed.

In a fourteenth example, having the same general arrangement as the thirteenth example, the numeral "2" of the litho-print image 754 shown in FIG. 16a is entirely contained within the boundary of the apple image 753. This allows all parts of the image 754 to be continuous unlike in the thirteenth example. FIG. 16b and FIG. 16c show the resultant effect (analogous to FIGS. 15b and 15c).

The optical properties of the photonic crystal within the examples described may also be additionally or alternatively further modified or enhanced by the use of nanoparticles positioned within the crystal structure, preferably at interstitial sites. The nanoparticles may be distributed substantially uniformly through the crystal such that each part of the crystal exhibits substantially the same optical effect. Alternatively the nanoparticles may be distributed inhomogeneously through the crystal such that different parts of the crystal exhibit a substantially different optical effect. Thus the nanoparticles may be distributed according to a concentration gradient. The nanoparticles may also be distributed in a number of regions having different concentrations.

In the examples described the photonic crystal material undergoes a change in optical effect which may be a colour change and therefore a visible-to-visible transition. Other contemplated examples include a switch from one visible colour to another on compression, a switch from invisible to coloured or from reflecting UV to being transparent to UV such that on being compressed a UV feature may be activated underneath the photonic crystal film.

Ideally, the current invention would work best with an inverse opal photonic crystal structure, which are known from WO2008098339. However, a noticeable effect may be achieved with a standard opal structure (such as described in US20040131799, US20050228072, US20040253443 and U.S. Pat. No. 6,337,131) if sufficient lattice distortion can be achieved, or if deformable spheres are used.

The use of a photonic crystal and an integral relief structure in a security device therefore provides a number of possible additional security features. These features enhance the authenticity of the security device and therefore any object to which the device is attached or in which it is positioned.

The invention claimed is:

1. A security device comprising:
a region of piezochromic material;
a first discrete absorbing region;
a second discrete absorbing region; and
an integrated relief structure that includes structural modulations, wherein
when the region of piezochromic material and the integrated relief structure are together subjected to a stress, an optical effect is generated in the region of piezochromic material by the stress causing localized modulations in the deformation of the piezochromic material, which are representative of the structural modulations of the integrated relief structure, such that the optical effect generated is representative of the structural modulations of the relief of the integrated relief structure;
at least one of the first discrete absorbing region and the second discrete absorbing region comprises the integrated relief structure; and
the structural modulations are modulations of the at least one of the first discrete absorbing region and the second discrete absorbing region.

2. The security device according to claim 1, wherein each of the first discrete absorbing region and the second discrete absorbing region comprises a relief structure.

3. The security device according to claim 2, wherein a first part of a composite image is represented in the first discrete absorbing region, and a second part of a composite image is represented in the second discrete absorbing region, such that the first and second images form a resultant composite image when combined.

4. The security device according to claim 1, wherein the first discrete absorbing region and the second discrete absorbing region are provided on opposing sides of the security device.

5. The security device according to claim 1, wherein the first discrete absorbing region and the second discrete absorbing region are of different colors.

6. The security device according to claim 1, wherein the integrated relief structure comprises perforated regions, an embossed surface, or a printed surface.

7. The security device according to claim 1, wherein the integrated relief structure is coupled to the region of piezochromic material.

8. The security device according to claim 1, wherein the security device further comprises an absorbing layer positioned between the region of piezochromic material and the integrated relief structure.

9. The security device according to claim 1, wherein the region of piezochromic material contains an absorbing phase.

10. The security device according to claim 1, wherein the integrated relief structure is mounted to or forms part of a substrate.

11. The security device according to claim 10, wherein a plurality of relief structures are provided.

12. The security device according to claim 11, wherein a first part of a composite image is represented in a first of the plurality of relief structures, and a second part of a composite image is represented in a second of the plurality of relief structures, such that the first part and the second part form a resultant composite image when combined.

13. The security device according to claim 11, wherein the plurality of relief structures are provided on opposing faces of the substrate.

14. The security device according to claim 11, wherein a first region of piezochromic material is provided to interact with a first of the plurality of relief structures and a second region of piezochromic material is provided to interact with a second of the plurality of relief structures.

15. The security device according to claim 1, wherein the security device further comprises a printed ink layer having a color that is substantially the same as at least one of: the color of the integrated relief structure; the color of light reflected from the region of piezochromic material when in a stressed state; or the color of light reflected from the region of piezochromic material when in an unstressed state.

16. The security device according to claim 1, wherein the region of piezochromic material is provided as a film.

17. The security device according to claim 1, wherein the region of piezochromic material is formed as a pigmented coating or a printed layer.

18. The security device according to claim 1, wherein the region of piezochromic material is partially transparent.

19. The security device according to claim 1, wherein the piezochromic material comprises nanoparticles.

20. The security device according to claim 1, wherein the integrated relief structure comprises a region that is raised or lowered with respect to surrounding material.

21. The security device according to claim 1, wherein when the integrated relief structure is arranged as an image, the optical effect reproduces the image.

22. The security device according to claim 1, wherein in the absence of the stress, the region of piezochromic material generates a first optical effect, and the optical effect generated as a result of the stress is a second optical effect.

23. The security device according to claim 22, wherein at least one of the first optical effect and the second optical effect is an optically variable effect.

24. The security device according to claim 1, wherein at least one of the first optical effect and the second optical effect is an effect in one of the ultra-violet, visible, or infra-red parts of the electromagnetic spectrum.

25. The security device according to claim 1, further comprising a transparent cover layer.

26. The security device according to claim 1, wherein the stress causes a temporary or permanent distortion within the structure of the region of piezochromic material.

27. The security device according to claim 1, wherein the stress is an internal stress or an applied compressive stress.

28. The security device according to claim 1, wherein the security device comprises a self-supporting layer.

29. The security device according to claim 1, wherein the security device is machine-readable.

30. The security device according to claim 1, wherein the region of piezochromic material is a photonic crystal.

31. A security document comprising the security device according to claim 1.

32. The security document according to claim 31, wherein the security device is located within the security document such that the region of piezochromic material has a first face on a first side of the security document, and a second face on an opposing side of the security document.

33. The security document according to claim 31, wherein the region of piezochromic material is mounted to a window in the security document.

* * * * *